United States Patent
Calluiere et al.

(10) Patent No.: US 10,507,802 B2
(45) Date of Patent: Dec. 17, 2019

(54) PIPE FOR HEATING AND TRANSPORTING A WASHER FLUID FOR A WINDSCREEN WIPER BLADE WITH TWO SPRAY LINES, WIPER DEVICE AND METHOD OF MANUFACTURE

(75) Inventors: Johan Calluiere, Plaisir (FR); Denis Thebault, Clermont Ferrand (FR); Jean-François Cointereau, Angers (FR); Jean-Michel Jarasson, Le Mesnil St Denis (FR); Pierre-Emmanuel Negre, Paris (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 392 days.

(21) Appl. No.: 13/876,481

(22) PCT Filed: Aug. 5, 2011

(86) PCT No.: PCT/EP2011/063552
§ 371 (c)(1),
(2), (4) Date: May 17, 2013

(87) PCT Pub. No.: WO2012/041581
PCT Pub. Date: Apr. 5, 2012

(65) Prior Publication Data
US 2013/0219647 A1    Aug. 29, 2013

(30) Foreign Application Priority Data
Sep. 29, 2010  (FR) ...................................... 10 03849

(51) Int. Cl.
*B60S 1/48*   (2006.01)
*B60S 1/38*   (2006.01)
(Continued)

(52) U.S. Cl.
CPC ............. *B60S 1/488* (2013.01); *B60S 1/3805* (2013.01); *B60S 1/524* (2013.01); *F16L 11/22* (2013.01); *F16L 53/38* (2018.01)

(58) Field of Classification Search
CPC ........ B60S 1/487; B60S 1/488; B60S 1/3803; B60S 1/3805; B60S 1/52; B60S 1/522;
(Continued)

(56) References Cited

U.S. PATENT DOCUMENTS 3,530,525 A * 9/1970 Abel ..................... B60S 1/3805
                                                      15/250.07
4,038,519 A * 7/1977 Foucras ................. A61M 1/369
                                                      138/133

(Continued)

FOREIGN PATENT DOCUMENTS

DE    41 18 926 A1    12/1992
DE    44 02 372 A1     8/1995
(Continued)

OTHER PUBLICATIONS

Machine translation of description portion of DE4402372, published Aug. 1995.*
(Continued)

*Primary Examiner* — Gary K. Graham
(74) *Attorney, Agent, or Firm* — Osha Liang LLP

(57) ABSTRACT

A pipe for heating and transporting a washer fluid for a windscreen wiper blade with a first spray line and a second spray line is disclosed. The pipe includes an extruded sleeve with at least two washer fluid circulation channels, in which sleeve at least two electric wires that are provided with heating elements of said pipe are embedded within the mass of the sleeve. In the pipe, the at least two electric wires are parallel to the at least two washer fluid circulation channels, the first washer fluid circulation channel is connected to said
(Continued)

first spray line of the wiper blade, and the second circulation channel for the washer fluid is connected to said second spray line of the wiper blade.

18 Claims, 2 Drawing Sheets

(51) Int. Cl.
*B60S 1/52* (2006.01)
*F16L 11/22* (2006.01)
*F16L 53/38* (2018.01)

(58) Field of Classification Search
CPC ....... B60S 1/524; H05B 3/58; H05B 2203/02; H05B 2203/014; B05B 1/24; F16L 11/12; F16L 11/22; F16L 53/35; F16L 53/38; F16L 53/34
USPC .............. 15/250.05, 250.07, 250.04, 250.02, 15/250.01; 138/33, 111, 115, 116, 117; 239/134, 135, 284.1, 130; 392/478; 174/8, 24, 47
See application file for complete search history.

(56) References Cited

U.S. PATENT DOCUMENTS

| | | | | |
|---|---|---|---|---|
| 4,194,536 A * | 3/1980 | Stine | ..................... | F16L 59/145 138/103 |
| 4,670,933 A * | 6/1987 | Toplenszky | ........... | B60S 1/3805 15/250.07 |
| 4,920,602 A * | 5/1990 | Kuehbauch | ........... | B60S 1/3415 15/250.04 |
| 5,327,614 A | 7/1994 | Egner-Walter et al. | | |
| 5,383,602 A * | 1/1995 | Edele | ..................... | B60S 1/522 15/250.01 |
| 5,791,377 A * | 8/1998 | LaRochelle | ............. | B60S 1/488 138/109 |
| 7,234,410 B2 * | 6/2007 | Quigley | ..................... | B32B 1/08 114/264 |
| 7,269,876 B2 * | 9/2007 | Vogt | ........................ | B60S 1/522 15/250.01 |
| 7,711,251 B2 * | 5/2010 | Barkey | .................... | H05B 3/78 392/465 |
| 2011/0185531 A1 * | 8/2011 | Egner-Walter | .......... | B60S 1/381 15/250.01 |

FOREIGN PATENT DOCUMENTS

| | | |
|---|---|---|
| DE | 10 2008 049269 A1 | 4/2010 |
| DE | 10 2008 049270 A1 | 4/2010 |
| EP | 0351527 A2 | 1/1990 |
| EP | 1 040 973 A2 | 10/2000 |
| JP | H09-207197 A | 8/1997 |
| WO | 2009/118286 A1 | 10/2009 |
| WO | 2010/034445 A1 | 4/2010 |

OTHER PUBLICATIONS

International Search Report issued in PCT/EP2011/063552 dated Oct. 28, 2011 (6 pages).

Office Action issued in corresponding European Application No. 11741214.8 dated Nov. 26, 2015 (5 pages).

Office Action issued in corresponding Japanese Application No. 2013-530648, dated Jul. 31, 2015 (9 pages).

* cited by examiner

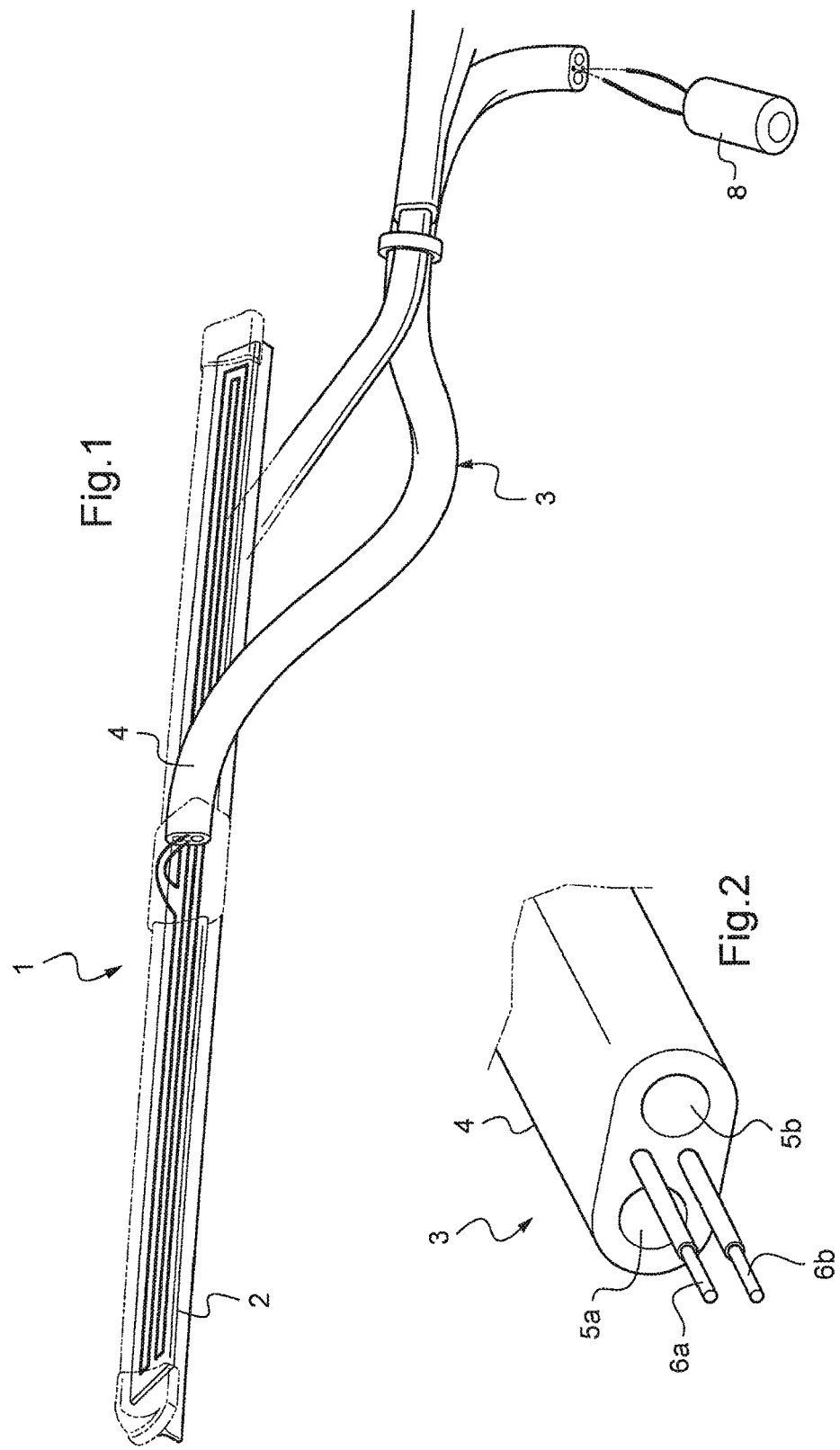

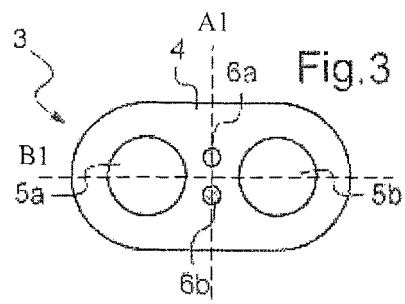
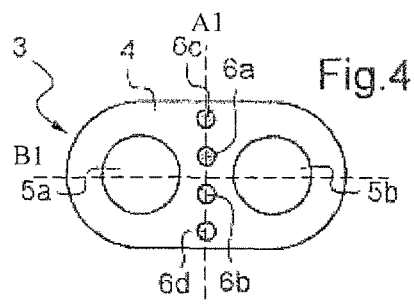
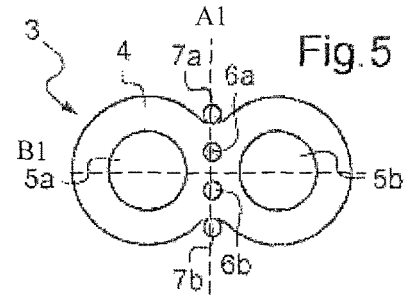
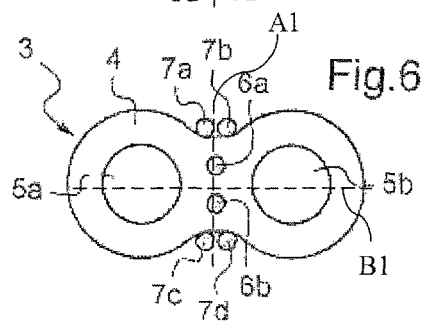
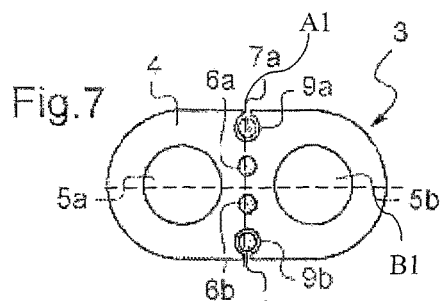
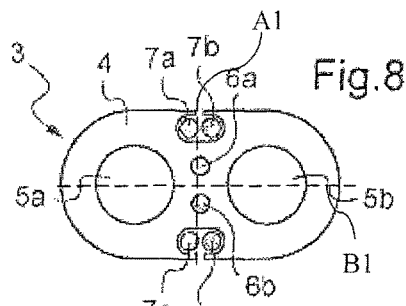
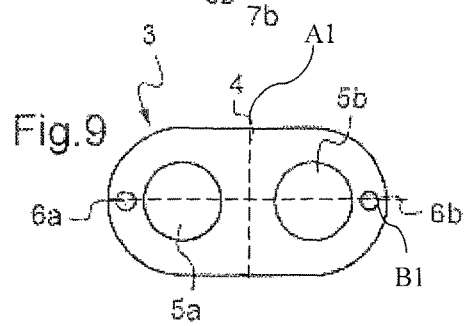
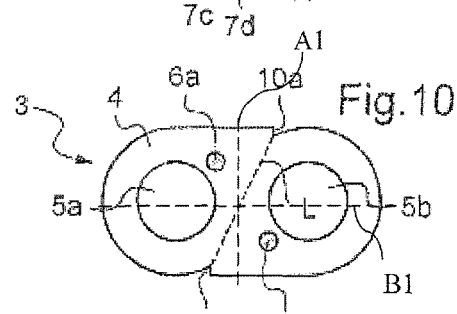
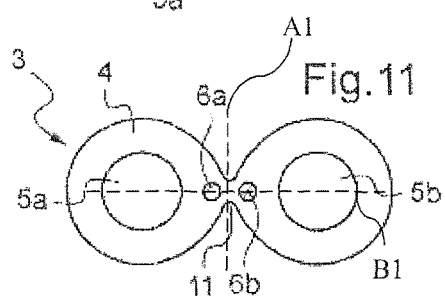
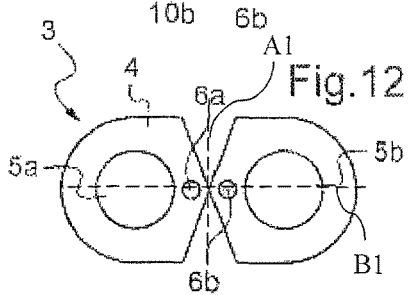

PIPE FOR HEATING AND TRANSPORTING A WASHER FLUID FOR A WINDSCREEN WIPER BLADE WITH TWO SPRAY LINES, WIPER DEVICE AND METHOD OF MANUFACTURE

BACKGROUND

The present invention relates to a pipe for heating and transporting a washer fluid for a windscreen wiper blade with two spray lines, for cleaning and deicing a glass automobile surface, such as the windscreen. The present invention also relates to a wiping device comprising such a pipe and a method for manufacturing such a pipe.

SUMMARY

In the existing windscreen wiper systems, it is known that improved cleaning of glass surfaces may be obtained by heating the wiper fluid before it is sprayed on the glass surface. Furthermore, the heated washer fluid may assist in deicing operations on glass surfaces.

Certain recent developments also propose that the wiper blade include two spray lines on either side of the wiper blade. The spray lines are provided with one or more pressurized spray jets or orifices, making it possible to distribute the washer fluid on the glass surface. The washer fluid is sent only on the front part of the blade, i.e., the washer fluid is sent on the spray line situated on the side on which the windscreen wiper blade advances during an ascending phase of the wiping and on the other side during the descending phase of the wiping. This arrangement makes it possible to wipe the washer fluid instantaneously after it is deposited on the glass surface, thereby eliminating any time period during which visibility may be reduced.

The jets are supplied with washer fluid contained in the reservoir by means of a pump. A pipe transports and heats the washer fluid taken from the reservoir through the pump toward the jet(s) for example when the washer command is actuated, generally by the control lever placed next to the steering wheel and controlling the activation of the wipers, among other things.

The heating strictly speaking of the wiper fluid may be done by a sheathed electrical heating wire submerged in the pipe so as to heat the washer fluid circulating therein. However, the presence of the electrical heating wire in the pipe may create pressure losses in the flow of the washer fluid, which can cause a decrease in the jet output pressure. One solution consists of providing a larger diameter for the pipes. However, the use of large pipes is difficult to reconcile with compact devices, such as the wiper blade with two spray lines in which two pipes are integrated. Further, the use of pumps with a higher flow rate involves an increased cost of the wiper device as well as greater current consumption.

One aim of the present invention is to offset these drawbacks by proposing an improved pipe for heating and transporting washer fluid, at a lower cost, that is compact and limits pressure losses in the flow of the washer fluid. Another aim of the present invention is to propose a manufacturing method that is simple to implement.

To that end, the present invention relates to a pipe for heating and transporting a washer fluid for a windscreen wiper blade with two spray lines, characterized in that it includes an extruded sleeve with at least two washer fluid circulation channels, in which sleeve at least two electric wires of said pipe are embedded within the mass of the sleeve.

The electric wires have heating elements or are designed to be connected to heating elements of the wiper blade. In this way, the washer fluid, the electricity and/or the heat may be conveyed in a same pipe up to the jet(s) without any obstacle in the circulation channel of the washer fluid while limiting the bulk and cost of that pipe.

According to one or more features of the heating and transport pipe considered alone or in combination:
    said pipe includes two first electric wires provided with heating elements embedded in the sleeve between the two circulation channels of the washer fluid,
    said pipe includes two second electric wires embedded in the sleeve to power a heating device of a wiper blade,
    said sleeve includes a flexible material,
    the cross-sections of the embedded electric wires are aligned at the center of the sleeve in a median direction with respect to the circulation channels,
    the cross-sections of the embedded electric wires and circulation channels are substantially aligned,
    the electric wires embedded in the sleeve are positioned at the ends of the cross-section of the sleeve,
    the cross-section of the sleeve is in the general shape of an 8 and said pipe includes at least one electric wire fixed to the outside of sleeve, in at least one hollow of a concave flank of the 8 shape,
    the periphery of the cross-section of the sleeve has two flat central opposite faces and two rounded end portions,
    a notch is formed in at least one flat central face of the periphery of the sleeve to clip at least one electric wire of said heating and transport pipe to the outside of the sleeve,
    the electric wires embedded in the sleeve are positioned on either side of a median plane with respect to the circulation channels.

According to one example embodiment, said heating and transport pipe has a weakening rim at least at one end of the sleeve to separate a first pipe end from the second pipe end, each pipe end comprising a washer fluid circulation channel and at least one electric wire. The weakening rim makes it possible to facilitate the separation of the pipe ends at the end of the sleeve, the separated ends being able to then be connected to a respective spray line and/or a pump.

According to a first example embodiment of the weakening rim, two flat central opposite faces of a sleeve end have two beveled slots at a complementary incline making it possible to facilitate the separation of a first and second pipe end.

According to a second example embodiment of the weakening rim, one sleeve end has a thinner central portion making it possible to facilitate the separation of a first and second pipe end.

The invention also relates to a wiper device for a glass surface of an automobile including a wiper blade provided with first and second spray lines on either side of the wiper blade, characterized in that it also includes a heating and transport pipe as previously described, whereof a first washer fluid circulation channel is connected on the one hand said first spray line of the wiper blade and on the other hand is designed to be connected to a pump and whereof the second circulation channel for the washer fluid is connected on the one hand to said second spray line of the wiper blade and is designed to be connected on the other hand to a pump.

According to one feature of the wiper device, two electric wires of said heating and transport pipe have heating elements extending in the wiper blade.

The heating device of the blade is thus powered without requiring intermediate electric wires between the transport and heating pipe and the wiper blade, for additional electrical cables to power the heating device of the wiper blade, which makes it possible to reduce costs and facilitate assembly.

The invention also relates to a method for manufacturing a pipe for heating and transporting a washer fluid, characterized in that at least one electric wire is inserted in a material being extruded through a channel suitable for shaping said sleeve.

By inserting the electric wires simultaneously with extrusion of the sleeve, the number of steps of the manufacturing method is decreased, thereby making it very simple and inexpensive. The implementation in the motor vehicle simplified, as one need only strip the electric wires to connect them without requiring the complicated steps of inserting them into the sleeve after the extrusion.

According to a first example embodiment of the manufacturing method, the extruded sleeve has two washer fluid circulation channels, and the ends of the sleeve are then separated into first and second free pipe ends each comprising a washer fluid circulation channel and at least one electric wire.

According to a second example embodiment of the manufacturing method, the first electric wire is inserted into a material during extrusion through a channel suitable for shaping a first sleeve portion having a first washer fluid circulation channel, a second electric wire is inserted into a material during extrusion through a channel suitable for shaping a second sleeve portion having a second washer fluid circulation channel, and said first and second sleeve portions are assembled between two free pipe ends.

BRIEF DESCRIPTION OF THE DRAWINGS

Other features and advantages of the invention will emerge from the following description, provided as a non-limiting example, in light of the appended drawings, in which:

FIG. 1 is a diagrammatic view of elements of a wiper device for a wiper blade with two spray lines, FIG. 2 is a partial perspective view of a heating and transport pipe of the wiper device of FIG. 1, FIG. 3 shows a cross-section of the pipe of FIG. 2, FIG. 4 shows a cross-section of an alternative of the pipe of FIG. 3, FIG. 5 shows a cross-section of another alternative of the pipe of FIG. 3, FIG. 6 shows a cross-section of another alternative of the pipe of FIG. 3, FIG. 7 shows a cross-section of another alternative of the pipe of FIG. 3, FIG. 8 shows a cross-section of another alternative of the pipe of FIG. 3, FIG. 9 shows a cross-section of another alternative of the pipe of FIG. 3, FIG. 10 shows a cross-section of another alternative of the pipe of FIG. 3, FIG. 11 shows a cross-section of another alternative of the pipe of FIG. 3, and FIG. 12 shows a cross-section of another alternative of the pipe of FIG. 3, In these figures, identical elements bear the same reference numbers.

DETAILED DESCRIPTION

FIG. 1 shows elements of a wiper device for a motor vehicle glass surface 1. The wiper device 1 includes a wiper blade 2 provided with first and second spray lines on either side of an blade of the windscreen wiper 2 (not shown). The spray lines are provided with one or more pressurized spray jets or orifices, making it possible to spray the washer fluid on the glass surface. The washer fluid is sent only on the front part of the windscreen wiper, i.e., the washer fluid is sent on the spray line situated on the side on which the blade of the windscreen wiper advances during the ascending phase of the wiping and on the other side during the descending phase of the wiping. This arrangement makes it possible to wipe the washer fluid immediately after it is deposited on the glass surface, thereby eliminating any interval during which visibility may be reduced.

The wiper device 1 also includes a washer fluid heating and transport pipe 3 to supply the spray lines with washer fluid contained in a reservoir of the motor vehicle by means of a pump. It is possible to use a two-way pump or two one-way pumps of the motor vehicle (not shown) for each spray line.

As can be seen in FIGS. 2 and 3 showing a transverse cross-section of the heating and transport pipe 3, the latter includes a sleeve 4, made from a flexible and insulating material, for example rubber. Said sleeve 4 includes two washer fluid circulation channels 5a, 5b and at least two electric wires 6a, 6b obtained by extrusion. The electric wires 6a, 6b embedded in the mass of the sleeve 4 are inserted with the extruded sleeve material.

A first washer fluid circulation channel 5a is connected on the one hand to the first spray line of the windscreen wiper 2 and on the other hand to a pump. The second washer fluid circulation channel 5b is connected on the one hand to the second spray line of the windscreen wiper 2 and on the other hand to a pump.

The electric wires 6a, 6b and the circulation channels 5a, 5b are substantially parallel to each other. In this first example, the periphery of the transverse cross-section of the sleeve 4 (outside the sleeve) has two flat central opposite faces and two rounded end portions.

The electric wires 6a, 6b have heating elements (the electric wire is for example a resistive heating wire) or are designed to be connected to heating elements of a heating device of the windscreen wiper such that the washer fluid taken from the reservoir by the pump(s) to the respective spray line is heated. In this way, improved cleaning of the glass surfaces is obtained by heating the washer fluid before it is sprayed on the glass surface. Furthermore, the heated washer fluid participates in deicing the glass surfaces.

To that end, sheathed electric wires 6a, 6b protrude on either side of the sleeve 4, to be stripped at the ends thereof and connected together on one side and to the power supply on the other side so as to form a current loop. For the connection of the washer fluid circulation channel 5a, liquid couplers are provided.

According to a first alternative shown in FIGS. 2 and 3, the two electric wires 6a, 6b are embedded substantially at the center of the sleeve 4, their cross-sections being substantially aligned in a median direction A1 with respect to the circulation channels 5a, 5b. The electric wires 6a, 6b include heating elements that can be connected to the power supplied by an electrical connector 8 (see FIG. 1).

During use, the electric wires 6a, 6b heat the sleeve 4, which in turn heats the washer fluid during its flow in the circulation channels 5a, 5b between the pump and the respective spray line.

According to one alternative not shown, a first electric wire 6a includes a heating element and a second electric wire 6b includes a ground cable. As before, the electric wires 6a, 6b protrude on either side of the sleeve so as to be able to be stripped at their ends, then connected together on the one hand and to the power supply on the other hand to form a current loop. However, the heating power necessary is then twice as significant as in the first example embodiment to obtain substantially the same temperature of the washer fluid. Furthermore, it is necessary to position the electric wire including the heating element between the washer fluid circulation channels 5a, 5b so as to be sure to heat the two washer fluid circulation channels 5a, 5b.

According to another alternative embodiment, the two electric wires 6a, 6b embedded in the sleeve 4 are designed to power an electrical device such as a heating device integrated into the windscreen wiper 2. The electric wires can be twisted, as they are not intended to heat the pipe. The heating and transport pipe 3 is thus used to convey the washer fluid and electricity to the windscreen wiper 2, by fixing the arrangement of the electric wires 6a, 6b with respect to their fluid circulation channels 5a, 5b. Furthermore, the implementation in the motor vehicle is made easier.

It is also possible to consider a combination of these examples. Thus, FIG. 4 shows another embodiment in which the sleeve 4 has two washer fluid circulation channels 5a, 5b and four embedded electric wires 6a, 6b, 6c and 6d. The cross-sections of the electric wires 6a, 6b, 6c, 6d are substantially aligned at the center of the sleeve 4 in a median direction A1 with respect to the circulation channels 5a, 5b.

A first pair of electric wires 6a, 6b for example includes heating elements and a second pair of electric wires 6c, 6d for example includes electrical cables to power a heating device integrated into the windscreen wiper 2. The washer fluid, the electricity and/or the heat may be conveyed in a same pipe as far as a respective spray line without obstacle in the washer fluid circulation channel and while limiting the bulk and cost.

It is also possible to provide that the two electric wires 6a, 6b of the heating and transport pipe 3 having heating elements extend in the windscreen wiper 2 (see FIG. 1). The heating device of the wiper is thus powered without requiring intermediate electrical connectors between the transport and heating pipe 3 and the windscreen wiper 2, or additional electrical cables to power the heating device of the windscreen wiper, which makes it possible to reduce costs and facilitate assembly.

In a second embodiment, a first pair of electric wires 6a, 6b including heating elements is embedded in the sleeve and at least one second pair of electric wires 7a, 7b is fixed to the outside of the sleeve 4. The electric wires 6a 6b, embedded in the sleeve 4, are provided with heating elements and the electric wires 7a, 7b, fixed to the outside of the sleeve 4, for example make it possible to power a heating device of a windscreen wiper.

According to a first alternative embodiment illustrated in FIG. 5, the cross-section of the sleeve 4 is in the general shape of an eight. The heating and transport pipe 3 includes two electric wires 6a, 6b, embedded in the sleeve 4, and two electric wires 7a, 7b fixed to the outside of the sleeve 4, respectively in the two concave sides of the eight shape of the sleeve 4.

According to a second alternative embodiment shown in FIG. 6, the general shape of the cross-section of the sleeve is more particularly in the shape of a dumbbell so as to fix four electric wires 7a, 7b, 7c, 7d of the heating and transport pipe 3 to the outside of the sleeve 4, two by two respectively on the two concave flanks of the dumbbell shape of the sleeve 4.

According to a third alternative embodiment shown in FIG. 7, in which the periphery of the cross-section of the sleeve 4 has two flat opposite central faces and two rounded end portions, two notches 9a, 9b are respectively formed in the two opposite flat central faces of the sleeve 4 to clip two electric wires 7a, 7b to the outside of the sleeve 4.

According to a fourth alternative embodiment shown in FIG. 8, each of the two notches 9a, 9b respectively clips two electric wires 7a, 7b and 7c, 7d to the outside of the sleeve 4.

It is also possible to provide for separating the ends of the heating and transport pipe 2 into two free pipe ends, for example over a length comprised between 50 and 100 mm, so as to be able to be connected easily. The electric wires embedded in the sleeve 4 are for example positioned on either side of a median plane B1 with respect to the circulation channels 5a, 5b such that each free pipe end comprises a washer fluid circulation channel 5a, 5b and at least one electric wire 6a, 6b.

For example, the electric wires 6a, 6b including heating elements embedded in the sleeve 4 are positioned on the edges of the sleeve 4, at the ends of the cross-section (FIG. 9). In that case, a first electric wire 6a is designed to heat a first washer fluid circulation channel 5a and a second electric wire 6b is designed to heat a second washer fluid circulation channel 5b. Furthermore, the separation of the pipe ends is made easier in this arrangement, as one need only sever (vertically in FIG. 4) the sleeve 4 at the middle thereof so as to separate a first pipe end comprising a washer fluid circulation channel 5a and an electric wire 6a from a second pipe end also comprising a washer fluid circulation channel 5b and electric wire 6b.

The heating and transport pipe 3 can also have a weakening rim at least at one sleeve end 4 to separate a first pipe end from a second pipe end, each pipe end comprising a washer fluid circulation channel 5a, 5b and at least one electric wire 6a, 6b. The weakening rim makes it possible to facilitate the separation of the pipe ends at the sleeve end, the separated ends being able to then be connected to a respective spray line and/or a respective pump.

According to a first example embodiment of the weakening rim shown in FIG. 10, two opposite outer faces of the sleeve end 4 have two beveled slots 10a, 10b with a complementary incline making it possible to facilitate the separation of a first and second pipe end. The electric wires 6a, 6b and the washer fluid circulation channels 5a, 5b are distributed on either side of a dotted line L in FIG. 6 connecting the beveled slots such that each separated pipe end comprises a washer fluid circulation channel 5a, 5b and an electric wire 6a, 6b.

According to a second example embodiment of the weakening rim shown in FIG. 11, a sleeve end 4 has a thinner central portion 11 making it possible to facilitate the separation of a first and second pipe end. The electric wires 6a, 6b and the washer fluid circulation channels 5a, 5b are distributed on either side of said thinner central portion 9, the cross-sections of the embedded electric wires and circulation channels being substantially aligned, such that each separated pipe end comprises a washer fluid circulation channel 5a, 5b and an electric wire 6a, 6b.

The heating and transport pipe 3 is obtained using the following manufacturing method. At least one electric wire 6a, 6b is inserted in a material being extruded through a channel suitable for shaping the sleeve 4, which makes it possible to decrease the number of steps of the manufacturing method, making it very simple and inexpensive.

The implementation of the motor vehicle is thus simplified, as one need only strip the electric wires to connect them without requiring the complicated steps of inserting them into the sleeve after the extrusion. The electric wires 6a, 6b can be inserted already sheathed to facilitate their placement in the extruded sleeve. Furthermore, it is possible to use stripped electric wires to be embedded in the extruded sleeve that serves as insulation. In the latter case, separating means are provided to keep the electric wires separated from each other for their insertion in the channel.

To that end, it is possible to provide that the pipe is manufactured in a single piece and the wiper device includes electrical connectors and liquid connectors to respectively connect the electric wires 6a, 6b to each other and their power supply and the washer fluid circulation channels 5a, 5b to their respective pump or spray jet.

According to another example embodiment, it is possible to manufacture a heating and transport pipe in a single piece, and the ends of the heating and transport pipe are then separated into two free pipe ends, each free pipe end comprising a washer fluid circulation channel 5a, 5b and at least one electric wire 6a, 6b.

It is also possible to provide for manufacturing a pipe whereof the pipe ends are already separated. For example, a first electric wire 6a is inserted in a material being extruded through a channel suitable for shaping it in a first sleeve portion having a first circulation channel for the washer fluid 5a. Additionally, a second electric wire 6b is inserted in a material being extruded through a channel suitable for shaping a second sleeve portion having a second washer fluid circulation channel 5b. The first and second sleeve portions are then assembled, for example, by gluing, between two free pipe ends (FIG. 12).

The invention claimed is:

1. A pipe for heating and transporting a washer fluid of a windscreen wiper blade with a first spray line and a second spray line, comprising:
   an extruded sleeve with at least two washer fluid circulation channels, in which sleeve at least two electric wires that are provided with heating elements of said pipe are embedded within the mass of the sleeve,
   wherein the at least two electric wires are parallel to the at least two washer fluid circulation channels,
   wherein the cross-sections of the embedded electric wires are aligned at the center of the sleeve in a median direction with respect to the circulation channels,
   wherein the cross-section of the sleeve is in a general shape of an "8" and said pipe includes at least one of the electric wires fixed to the outside of the sleeve in at least one hollow of a concave flank of the "8" shape,
   wherein the median direction passes between the circulation channels,
   wherein the first washer fluid circulation channel is connected to said first spray line of the wiper blade, and
   wherein the second circulation channel for the washer fluid is connected to said second spray line of the wiper blade.

2. The pipe for heating and transporting according to claim 1, wherein the at least two electric wires comprises two first electric wires, the two first electric wires are provided with the heating elements and embedded in the sleeve between the two circulation channels of the washer fluid.

3. The pipe for heating and transporting according to claim 2, further comprising two second electric wires embedded in the sleeve to power a heating device of a wiper blade.

4. The pipe for heating and transporting according to claim 1, wherein said sleeve includes a flexible material.

5. The pipe for heating and transporting according to claim 1, wherein a periphery of the cross-section of the sleeve has two substantially flat central opposite faces and two rounded end portions.

6. A pipe for heating and transporting a washer fluid of a windscreen wiper blade with a first spray line and a second spray line, comprising:
   an extruded sleeve with at least two washer fluid circulation channels, in which sleeve at least two electrical wires that are provided with heating elements of said pipe are embedded within the mass of the sleeve,
   wherein the at least two electric wires are located outside of the at least two washer fluid circulation channels,
   wherein the at least two electric wires are parallel to the at least two washer fluid circulation channels,
   wherein the cross-sections of the embedded electric wires and circulation channels are substantially aligned in a same linear plane that overlaps a center of each of the two washer fluid circulation channels,
   wherein the first washer fluid circulation channel is connected to said first spray line of the wiper blade, and
   wherein the second circulation channel for the washer fluid is connected to said second spray line of the wiper blade.

7. The pipe for heating and transporting according to claim 6, wherein the electric wires embedded in the sleeve are positioned at ends of a cross-section of the sleeve.

8. The pipe for heating and transporting according to claim 6, wherein the cross-section of the sleeve is in the general shape of an "8".

9. The pipe for heating and transporting according to claim 6, wherein the electric wires embedded in the sleeve are positioned on either side of a median plane with respect to the circulation channels.

10. The pipe for heating and transporting according to claim 6, further comprising a weakening rim at least at one end of the sleeve to separate a first pipe end from the second pipe end, each pipe end comprising the washer fluid circulation channel and at least one electric wire.

11. The pipe for heating and transporting according to claim 10, wherein two flat central opposite faces of a sleeve end have two beveled slots at a complementary incline to facilitate the separation of a first and second pipe end.

12. The pipe for heating and transporting according to claim 10, wherein one sleeve end has a thinner central portion to facilitate the separation of a first and second pipe end.

13. A pipe for heating and transporting a washer fluid of a windscreen wiper blade with a first spray line and a second spray line, comprising:
   an extruded sleeve with a first washer fluid channel and second washer fluid circulation channel, in which sleeve at least two electric wires of said pipe are embedded within the mass of the sleeve,
   wherein the cross-sections of the embedded electric wires are aligned towards the center of the sleeve in a median direction with respect to the circulation channels, wherein the median direction passes between the circulation channels, wherein a periphery of the cross-section of the sleeve has two substantially flat central opposite faces and two rounded end portions, wherein two flat central opposite faces of a sleeve end have two beveled slots at a complementary incline to facilitate the separation of a first and second pipe end, wherein the first washer fluid circulation channel is connected to said first spray line of the wiper blade, and wherein the second circulation channel for the washer fluid is connected to said second spray line of the wiper blade.

14. The pipe for heating and transporting according to claim 13, wherein two electric wires of said pipe for heating and transporting have heating elements extending in the wiper blade.

15. The pipe for heating and transporting according to claim 13, further comprising a weakening rim at least at one end of the sleeve to separate a first pipe end from the second pipe end, each pipe end comprising the washer fluid circulation channel and at least one electric wire.

16. A method for manufacturing a pipe for heating and transporting a washer fluid for a windscreen wiper blade with two spray lines that comprises an extruded sleeve with at least two washer fluid circulation channels, in which sleeve at least two electric wires of said pipe are embedded within the mass of the sleeve, the method comprising:

inserting the at least two electric wires in a material being extruded through a channel suitable for shaping said sleeve, wherein the extruded sleeve has the at least two washer fluid circulation channels, wherein the at least two electric wires are parallel to the at least two washer fluid circulation channels, wherein the cross-sections of the embedded electric wires are aligned at the center of the sleeve in a median direction with respect to the circulation channels, wherein the median direction passes between the circulation channels, and wherein the first electric wire is inserted into a material during extrusion through a channel suitable for shaping a first sleeve portion having a first washer fluid circulation channel, and the second electric wire is inserted into a material during extrusion through a channel suitable for shaping a second sleeve portion having a second washer fluid circulation channel, wherein said first and second sleeve portions are assembled between two free pipe ends.

17. The method according to claim 16, wherein the first washer fluid circulation channel and the second circulation channel are configured for connection to one or more.

18. A pipe for heating and transporting a washer fluid of a windscreen wiper blade with two spray lines, comprising:

an extruded sleeve with at least two washer fluid circulation channels, in which sleeve at least two first electrical wires of said pipe are embedded within the mass of the sleeve between the two circulation channels of the washer fluid and provided with heating elements, wherein the at least two electric wires are parallel to the at least two washer fluid circulation channels, wherein a periphery of the cross-section of the sleeve has two flat central opposite faces and two rounded end portions, wherein a notch is formed in at least one of the two flat central opposite faces of the periphery of the cross-section of the sleeve to clip at least one electric wire of said heating and transport pipe to the outside of the sleeve, wherein the first washer fluid circulation channel is connected to said first spray line of the wiper blade, and wherein the second circulation channel for the washer fluid is connected to said second spray line of the wiper blade.

* * * * *